Patented Sept. 20, 1949

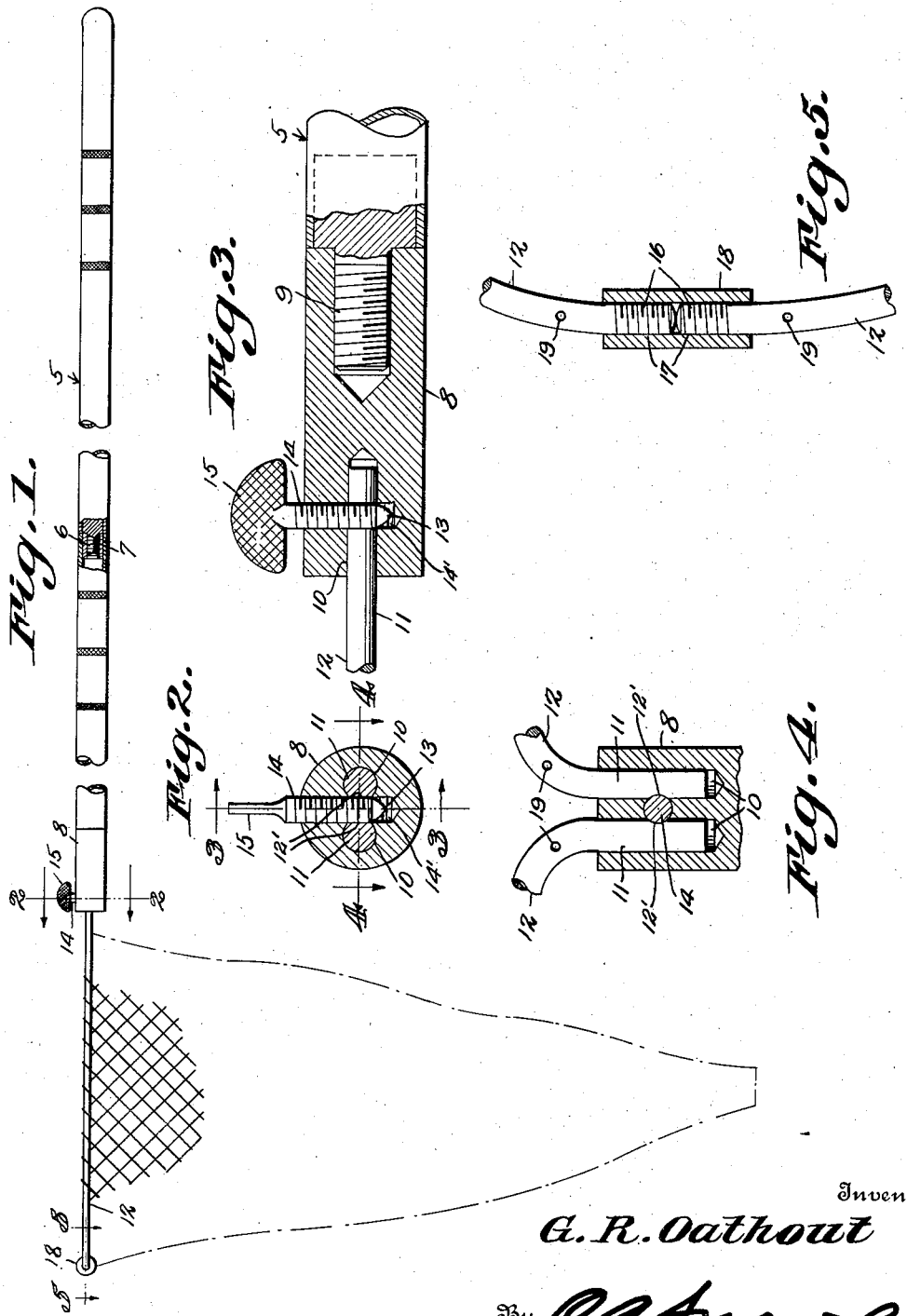

2,482,718

UNITED STATES PATENT OFFICE 2,482,718

FISH LANDING NET

Guy Raymond Oathout, Fort Atkinson, Wis.

Application January 27, 1947, Serial No. 724,553

1 Claim. (Cl. 43—12)

This invention relates to fish landing nets which are used in dipping fish from the water after they have been caught on a line and moved to a position so that they may be caught in the net, the primary object of the invention being to provide a fish landing net which may be folded into a small and compact package to permit it to be stored or transported with facility.

An important object of the invention is to provide a landing net including a sectional hoop, there being provided means for securing the sections of the hoop in one end of a tubular union, in such a way that the hoop may be extended and securely held in its extended position for supporting the net, or the hoop may be readily collapsed for storing.

Still another object of the invention is the provision of means for securing the net to the hoop, to insure the net being held in its proper position on the hoop, regardless of whether the net is extended for use or folded for storing.

With the foregoing and other objects in view which will appear as the description proceeds, the invention consists of certain novel details of construction and combinations of parts, hereinafter more fully described and pointed out in the claim, it being understood that changes may be made in the construction and arrangement of parts within departing from the spirit of the invention as claimed.

Referring to the drawing

Figure 1 is an elevational view illustrating a fish landing net, constructed in accordance with the invention.

Figure 2 is a sectional view taken on line 2—2 of Figure 1.

Figure 3 is a sectional view taken on line 3—3 of Figure 2.

Figure 4 is a sectional view taken on line 4—4 of Figure 2.

Figure 5 is a sectional view taken on line 5—5 of Figure 1.

Referring to the drawing in detail, the landing net comprises a sectional handle indicated by the reference character 5, the sections of the handle being secured together by means of the threaded shank 6 which fits in the threaded socket 7 of the adjacent handle section.

The reference character 8 indicates a tubular connecting member which has internal threads for the reception of the threaded shank 9 of the innermost handle section.

This tubular connecting member is formed with a pair of bores 10 that extend longitudinally inwardly from the outer end of the tubular connecting member, the bores being of diameters to receive the right angled ends 11 of the hoop sections 12. The right angled ends 11 are formed with recesses 12' to accommodate the winged screw 14, which wedges between the right angled ends of the hoop sections securely holding them in position against turning.

As shown by Figure 3 of the drawing, this winged screw extends into a threaded opening 14' formed in the tubular connecting member, the wing portion 15 thereof being knurled to permit ready operation thereof.

The outer ends of the hoop sections are formed with oppositely disposed threads 16 that cooperate with the oppositely disposed internal threads 17, formed within the sleeve 18. Thus, it will be seen that due to this construction, when the sections of the hoop are extended and the sleeve is rotated in one direction, the outer ends of the hoop sections will be brought together in the formation of a hoop.

It will, of course, be understood that the winged screw 14 will be operated to force the right angled ends of the hoop sections into close engagement with the walls of the openings in which they are positioned, to prevent turning or movement of the inner ends of the hoop sections, with respect to the tubular connecting member 8.

These hoop sections are also formed with openings 19, which openings are provided to receive strings of the net, to secure the net to the hoop in such a way that the net will not slide over the hoop, and will be held in proper extended position on the hoop at all times.

Due to applicant's construction, it will be obvious that the fish landing net may be readily and easily collapsed and stored to facilitate handling of the net when not in use.

The net may be readily extended for use without the use of tools or similar assembling means.

What is claimed is:

In a landing net, a handle, a split hoop to which a net is secured, said hoop embodying right-angled parallel ends having notches in the adjacent inner sides thereof, a removable connecting member connecting the handle and hoop, said connecting member having spaced bores extending inwardly from one end thereof, within which the ends of the split hoop are positioned, said connecting member having a threaded bore disposed at right angles to the spaced bores between the spaced bores and communicating with said spaced bores, the notches of the ends of the hoop falling opposite to the threaded bore when the ends of the hoop are positioned within the bores, and a set screw fitted in the threaded bore in contact with the walls of the notches, securing the ends of the hoop against displacement within said bores.

GUY RAYMOND OATHOUT.

REFERENCES CITED

The following references are of record in the file of this patent:

UNITED STATES PATENTS

| Number | Name | Date |
|---|---|---|
| 44,652 | Peck | Oct 11, 1864 |
| 64,451 | Babcock | Apr. 30, 1867 |
| 138,451 | Stiles | May 6, 1873 |
| 407,979 | Wheeler | July 30, 1889 |
| 1,262,482 | Hales | Apr. 9, 1918 |
| 1,542,213 | Brockett | June 16, 1925 |
| 1,657,892 | Muldoon | Jan. 31, 1928 |